United States Patent
Nishiguchi et al.

(10) Patent No.: US 8,026,320 B2
(45) Date of Patent: Sep. 27, 2011

(54) CATIONIC ELECTRODEPOSITION COATING COMPOSITION

(75) Inventors: Shigeo Nishiguchi, Hiratsuka (JP); Akihiko Shimasaki, Hiratsuka (JP)

(73) Assignee: Kansai Print Co., Ltd, Hyogo (JP)

( * ) Notice: Subject to any disclaimer, the term of this patent is extended or adjusted under 35 U.S.C. 154(b) by 0 days.

(21) Appl. No.: 12/801,164

(22) Filed: May 26, 2010

(65) Prior Publication Data

US 2010/0300885 A1 Dec. 2, 2010

(30) Foreign Application Priority Data

May 26, 2009 (JP) ................ 2009-125915

(51) Int. Cl.
- *B32B 15/08* (2006.01)
- *C08K 3/20* (2006.01)
- *C08L 63/00* (2006.01)
- *C08L 63/02* (2006.01)

(52) U.S. Cl. .................... 525/526; 428/418; 523/404

(58) Field of Classification Search .................... None
See application file for complete search history.

(56) References Cited

U.S. PATENT DOCUMENTS

| | | | | |
|---|---|---|---|---|
| 4,657,947 A | * | 4/1987 | Kojo et al. | 523/455 |
| 4,698,141 A | * | 10/1987 | Anderson et al. | 204/503 |
| 4,767,832 A | * | 8/1988 | Marx | 525/523 |
| 2010/0270162 A1 | * | 10/2010 | Nishiguchi et al. | 205/50 |

FOREIGN PATENT DOCUMENTS

| | | |
|---|---|---|
| JP | 2003-306796 | 10/2003 |
| JP | 2007-302792 | 11/2007 |

* cited by examiner

*Primary Examiner* — Robert Sellers
(74) *Attorney, Agent, or Firm* — Wenderoth, Lind & Ponack, L.L.P.

(57) ABSTRACT

An object of the present invention is to provide a coating composition that has excellent electrodeposition coating applicability onto hot dip galvanized steel sheets, and that provides a cationic electrodeposition coating film having a superior finish and excellent anti-corrosion properties.

The present invention provides a cationic electrodeposition coating composition having: amino group-containing modified epoxy resin (A), phenolic hydroxy group-containing resin (B), and blocked polyisocyanate curing agent (C), the components (A), (B), and (C) being contained in amounts of 5 to 50 mass %, 20 to 75 mass %, and 10 to 40 mass %, respectively, based on the total solids mass of the components (A), (B), and (C).

5 Claims, 1 Drawing Sheet

CATIONIC ELECTRODEPOSITION COATING COMPOSITION

TECHNICAL FIELD

The present invention relates to a cationic electrodeposition coating composition that has excellent electrodeposition coating applicability onto hot dip galvanized steel sheets, and that can provide a cationic electrodeposition coating film having excellent anti-corrosion properties and a superior finish, in particular, a superior finish at a dried film thickness of 15 μm.

BACKGROUND ART

Because of their excellent coating operability and good anti-corrosion properties of the resulting coating films, cationic electrodeposition coating compositions are widely used as undercoating compositions for conductive metal products such as automobile bodies, which are required to have the aforementioned properties. In electrodeposition coating using cationic electrodeposition coating compositions, attempts are made to maintain the inner film thickness of bag portions and gap portions to ensure anti-corrosion properties, and to optimize or make the outer film thickness uniform (for example, to ensure the film thickness of a portion where finish and anti-corrosion properties are valued) for improving the quality of automobile bodies and reducing the cost.

However, in coating films obtained using conventional electrodeposition coating compositions, a reduction in thickness from 20 μm to 15 μm may result in a poor finish due to an uneven substrate and a reduction in heat flow properties. Further, for the purpose of improving finish, if the amount of plastic components used in the coating film is increased to improve heat flow properties during heating and drying, anti-corrosion properties tend to be lowered. Because of these factors, it was difficult to provide an electrodeposition coating film having both satisfactory finish and anti-corrosion properties at a dried film thickness of 15 μm.

In view of these circumstances, the development of a cationic electrodeposition coating composition that exhibits excellent electrodeposition coating applicability onto hot dip galvanized steel sheets in an article having complicated bag portions and gap portions; and that provides a cationic electrodeposition coating film having excellent anti-corrosion properties and a superior finish, in particular, a superior finish at a dried film thickness of 15 μm, has been desired.

Patent Literature 1 discloses a method for producing a coating film, the method being characterized in that, in the electrodeposition coating of a cationic electrodeposition coating composition, the electric quantity required for initiating the deposition of a coating film is 100 to 400 $C/m^2$, and the polarization resistance value per unit film thickness is 50 to 300 $k\Omega \cdot cm^2/\mu m$. This method considers various resin components.

Further, Patent Literature 2 discloses an anion electrodeposition coating composition comprising a carboxyl group-containing polyester resin and a cross-linking agent, the composition further comprising a resol phenolic resin to improve anti-corrosion properties.

However, the above findings cannot provide an electrodeposition coating film having excellent anti-corrosion properties and a satisfactory finish, particularly, a satisfactory finish at a dried film thickness of 15 μm.

CITATION LIST

Patent Literature

[PTL 1]
Japanese Unexamined Patent Publication No. 2003-306796
[PTL 2]
Japanese Unexamined Patent Publication No. 2007-302792

SUMMARY OF INVENTION

Technical Problem

An object of the present invention is to provide a coating composition that has excellent electrodeposition coating applicability onto hot dip galvanized steel sheets, and that provides a cationic electrodeposition coating film having excellent anti-corrosion properties and a superior finish, in particular, a superior finish at a dried film thickness of 15 μm.

Solution to Problem

To achieve the above object, the present inventors conducted extensive research. As a result, they found that the object can be achieved by a cationic electrodeposition coating composition comprising amino group-containing modified epoxy resin (A), phenolic hydroxy group-containing resin (B), and blocked polyisocyanate curing agent (C), wherein component (A) is contained in an amount of 20 to 75 mass %, component (B) is contained in an amount of 5 to 50 mass %, and component (C) is contained in an amount of 10 to 40 mass %, based on the total solids mass of components (A), (B), and (C). The present invention was thus accomplished.

That is, the present invention provides the following.

Items

1. A cationic electrodeposition coating composition comprising:

amino group-containing modified epoxy resin (A), phenolic hydroxy group-containing resin (B), and blocked polyisocyanate curing agent (C), said component (A) being contained in an amount of 20 to 75 mass %, said component (B) being contained in an amount of 5 to 50 mass %, and said component (C) being contained in an amount of 10 to 40 mass %, based on the total solids mass of said components (A), (B), and (C), said phenolic hydroxy group-containing resin (B) being obtainable by reacting diepoxy compound (b11) and/or epoxy resin (b12) having an epoxy equivalent of 170 to 500 with bisphenol compound (b13) at an equivalent ratio of [epoxy groups in said diepoxy compound (b11) and epoxy resin (b12)]/[phenol groups in said bisphenol compound (b13)]=0.5 to 0.85,
said diepoxy compound (b11) being compound
(1) represented by Formula (1),

[Chem. 1]

(1)

wherein $R^1$ is the same or different, and each represents a hydrogen atom or $C_{1-6}$ alkyl group; and m and n, which represent the number of repeating units of a portion having an alkylene oxide structure, are integers where m+n=1 to 20, and/or
compound (2) represented by Formula (2),

[Chem. 2]

(2)

wherein $R^2$ is the same or different, and each represents a hydrogen atom or $C_{1-6}$ alkyl group; X represents an integer of 1 to 9; and Y represents an integer of 1 to 50.

2. The cationic electrodeposition coating composition according to Item 1, wherein amino group-containing modified epoxy resin (A) is amino group-containing modified epoxy resin (A1) obtainable by reacting modified epoxy resin (A11) having an epoxy equivalent of 500 to 2,500 with amine compound (A12),
wherein said modified epoxy resin (A11) is obtainable by reacting diepoxy compound (b11), epoxy resin (b12) having an epoxy equivalent of 170 to 500, and bisphenol compound (b13).

3. The cationic electrodeposition coating composition according to Item 2, wherein modified epoxy resin (A11) comprises said diepoxy compound (b11), said epoxy resin (b12), and said bisphenol compound (b13) in amounts of 1 to 35 mass %, 10 to 80 mass %, and 10 to 60 mass %, respectively, based on the total solids mass of said diepoxy compound (b11), epoxy resin (b12), and bisphenol compound (b13).

4. The cationic electrodeposition coating composition according to Item 2, wherein, in Formula (1) or (2) of diepoxy compound (b11) used as a starting material of phenolic hydroxy group-containing resin (B) and modified epoxy resin (A11), $R^1$ represents a methyl group or a hydrogen atom.

5. A coated article obtainable by immersing a metal article containing a hot dip galvanized steel sheet in a bath containing the cationic electrodeposition coating composition according to any one of Items 1 to 4, and performing electrodeposition coating.

Advantageous Effects of Invention

The cationic electrodeposition coating composition of the present invention can provide a coated article that has excellent electrodeposition coating applicability onto hot dip galvanized steel sheets, and that comprises a cationic electrodeposition coating film having excellent anti-corrosion properties and a superior finish, in particular, a superior finish at a dried film thickness of 15 μm.

Specifically, the cationic electrodeposition coating composition of the present invention can provide the following.

1. Since amino group-containing modified epoxy resin (A) and phenolic hydroxy group-containing resin (B) have excellent compatibility, the cationic electrodeposition coating composition of the present invention exhibits high adhesion properties to a metal substrate. Accordingly, a coated article that comprises an electrodeposition coating film having excellent anti-corrosion properties and a superior finish at a dried film thickness of 15 μm can be obtained.

2. Since amino group-containing modified epoxy resin (A1) using diepoxy compound (b11) can impart plasticity to an epoxy resin skeleton, it is possible to improve electrodeposition coating applicability onto hot dip galvanized steel sheets and a finish, particularly, a finish at a dried film thickness of 15 μm.

DESCRIPTION OF EMBODIMENTS

The present invention relates to a cationic electrodeposition coating composition comprising amino group-containing modified epoxy resin (A), specific phenolic hydroxy group-containing resin (B), and blocked polyisocyanate curing agent (C), wherein component (A) is contained in an amount of 20 to 75 mass %, component (B) is contained in an amount of 5 to 50 mass %, and component (C) is contained in an amount of 10 to 40 mass %, based on the total solids mass of components (A), (B), and (C).

The present invention is detailed below.
Amino Group-Containing Modified Epoxy Resin (A)
Amino group-containing modified epoxy resin (A) for use in the cationic electrodeposition coating composition of the present invention is obtainable by adding an amine compound to an epoxy resin. From the standpoint of anti-corrosion properties, in particular, corrosion resistance of the film, epoxy resins obtainable by reacting a polyphenol compound and an epihalohydrin are preferable.

Examples of polyphenol compounds used for forming such epoxy resins include conventionally known compounds, such as bis(4-hydroxyphenyl)-2,2-propane (bisphenol A), 4,4'-dihydroxybenzophenone, bis(4-hydroxyphenyl)methane (bisphenol F), bis(4-hydroxyphenyl)-1,1-ethane, bis(4-hydroxyphenyl)-1,1-isobutane, bis(4-hydroxy-tert-butyl-phenyl)-2,2-propane, bis(2-hydroxynaphthyl)methane, tetra(4- hydroxyphenyl)-1,1,2,2-ethane, 4,4'-dihydroxydiphenylsulfone (bisphenol S), phenol novolac, cresol novolac, etc.

Of epoxy resins obtainable by reacting a polyphenol compound with epichlorohydrin, those of the following Formula (3) derived from bisphenol A are preferable,

[Chem. 3]

(3)

wherein p is preferably 0 to 8.

Such epoxy resins have an epoxy equivalent of 180 to 2,500, preferably 200 to 2,000, and a number average molecular weight of 400 to 4,000, preferably 800 to 2,500.

Examples of commercial products of such epoxy resins include those available from Japan Epoxy Resins Co., Ltd. under the trade names of jER828EL, jER1002, jER1004, jER1007, etc.

The aforementioned amine compound is a cationic group-introducing component for introducing an amino group to the epoxy resin to cationize the epoxy resin, and comprises at least one active hydrogen to react with the epoxy group.

Examples of amine compounds used for such a purpose include monomethylamine, dimethylamine, monoethylamine, diethylamine, monoisopropylamine, diisopropylamine, monobutylamine, dibutylamine, and like mono- or di-alkylamines; monoethanolamine, diethanolamine, mono(2-hydroxypropyl)amine, di(2-hydroxypropyl)amine, monomethylaminoethanol, monoethylaminoethanol, and like alkanolamines; ethylenediamine, propylenediamine, butylenediamine, hexamethylenediamine, tetraethylenepentamine, pentaethylenehexamine, diethylaminopropylamine, diethylenetriamine, triethylenetetramine, and like alkylene polyamines and ketiminized compounds of these polyamines; ethyleneimine, propyleneimine and like alkyleneimines; piperazine, morpholine, pyrazine and like cyclic amines. Additionally, it is also possible to use ketiminized amines obtained by ketiminizing primary amines, among the above-mentioned amines.

Of amino group-containing modified epoxy resins (A), the use of specific amino group-containing modified epoxy resin (A1) can provide an electrodeposition coating film having a superior finish and excellent anti-corrosion properties at a dried film thickness of 15 μm. The amino group-containing modified epoxy resin used in the present invention is detailed below.

Amino Group-Containing Modified Epoxy Resin (A1)

In the present specification, amino group-containing modified epoxy resin (A1) means a resin obtained by reacting amine compound (A12) with modified epoxy resin (A11) having an epoxy equivalent of 500 to 2,500, modified epoxy resin (A11) being obtained by reacting specific resin components described below. To improve finish, particularly finish at a dried film thickness of 15 μm, the use of modified epoxy resin (A11) is preferable.

Modified Epoxy Resin (A11) Having an Epoxy Equivalent of 500 to 2,500:

Modified epoxy resin (A11) having an epoxy equivalent of 500 to 2,500 is a resin obtainable by reacting specific diepoxy compound (b11), epoxy resin (b12) having an epoxy equivalent of 170 to 500, and bisphenol compound (b13).

Diepoxy Compound (b11):

As diepoxy compound (b11), compound (1) represented by Formula (1) can be used,

Compound (1)

[Chem. 4]

(1)

wherein $R^1$ is the same or different, and each represents a hydrogen atom or a $C_{1-6}$ alkyl group; m and n, which represent the number of repeating units of the portion having an alkylene oxide structure, are integers where m+n=1 to 20.

Compound (1) can be produced by adding alkylene oxide represented by Formula (4) to bisphenol A to obtain a hydroxy-terminated polyether compound,

[Chem. 5]

(4)

wherein $R^3$ represents a hydrogen atom or a $C_{1-6}$ alkyl group, and then allowing the polyether compound to react with epihalohydrin to obtain a diepoxy compound.

Examples of alkylene oxide represented by Formula (4) include ethylene oxide, propylene oxide, butylene oxide and like $C_{2-8}$ alkylene oxide.

Of these, ethylene oxide (compounds in which $R^3$ in Formula (4) (corresponding to $R^1$ in Formula (1)) is a hydrogen atom) and propylene oxide (compounds in which $R^3$ in Formula (4) (corresponding to $R^1$ in Formula (1)) is methyl) are preferable.

Compound (2)

As diepoxy compound (b11), compound (2) represented by Formula (2) can be used,

[Chem. 6]

(2)

wherein $R^2$ is the same or different, and each represents a hydrogen atom or a $C_{1-6}$ alkyl group; X is an integer of 1 to 9; and Y is an integer of 1 to 50.

In the present invention, when Y is an integer of 2 or more, X contained in each alkylene oxide unit may be the same or different.

Examples of the method for producing compound (2) include method (1) in which alkylene oxide represented by Formula (4) is subjected to ring-opening polymerization using alkylene glycol as a starting material, thereby obtaining hydroxyl-terminated polyalkylene oxide, and the polyalkylene oxide is allowed to react with epihalohydrin to form a diepoxy compound.

Another example of the method for producing compound (2) includes method (2) in which alkylene glycol represented by Formula (5), or polyether diol obtained by condensing two or more alkylene glycol molecules by dehydration is allowed to react with epihalohydrin to form a diepoxy compound,

[Chem. 7]

(5)

wherein $R^4$ represents a hydrogen atom or a $C_{1-6}$ alkyl group, and X is an integer of 1 to 9.

Examples of alkylene glycol represented by Formula (5) used herein include ethylene glycol, propylene glycol, trimethylene glycol, 1,4-butanediol, 1,3-butanediol, 1,5-pentanediol, 1,6-hexanediol, 1,8-octanediol, 1,10-decanediol, and like $C_{2-10}$ alkylene glycol.

Examples of diepoxy compounds (b11) represented by Formula (1) or Formula (2) include Denacol EX-850, Denacol EX-821, Denacol EX-830, Denacol EX-841, Denacol EX-861, Denacol EX-941, Denacol EX-920, Denacol EX-931 (produced by Nagase Chemtex Corporation); Glyci-ale PP-300P and Glyci-ale BPP-350 (produced by Sanyo Chemical Industries, Ltd.), etc. As diepoxy compound (b11), compounds (1) and (2) may be used in combination.

Epoxy Resin (b12) Having an Epoxy Equivalent of 170 to 500:

Suitable epoxy resin (b12) for use in the production of modified epoxy resin (A11) having an epoxy equivalent of 500 to 2,500 is a compound having two or more epoxy groups per molecule. Examples of such compounds include those other than diepoxy compounds (b11), i.e., those other than compounds (1) represented by Formula (1) and compounds (2) represented by Formula (2). Epoxy resin (b12) preferably has a number average molecular weight of 340 to 1,500, and more preferably 340 to 1,000, and an epoxy equivalent of 170 to 500, and more preferably 170 to 400. In particular, epoxy resin (b12) obtained by reacting a polyphenol compound with epihalohydrin is preferable.

The "number average molecular weight" herein is a value determined according to the method of JIS K 0124-83, from a chromatogram measured by gel permeation chromatograph, based on the molecular weight of standard polystyrene. For gel permeation chromatograph, "HLC8120GPC" (produced by Tosoh Corporation) was used. The measurement was conducted using four columns "TSK GEL G-4000HXL", "TSK GEL G-3000HXL", "TSK GEL G-2500HXL", and "TSK GEL G-2000HXL" (trade names; produced by Tosoh Corporation) under the following conditions; mobile phase: tetrahydrofuran; measuring temperature: 40° C.; flow rate: 1.0 ml/min; and detector: RI.

Examples of polyphenol compounds used for forming such epoxy resins include bis(4-hydroxyphenyl)-2,2-propane (bisphenol A), bis(4-hydroxyphenyl)methane (bisphenol F), bis(4-hydroxycyclohexyl)methane (hydrogenated bisphenol F), 2,2-bis(4-hydroxycyclohexyl)propane (hydrogenated bisphenol A), 4,4'-dihydroxybenzophenone, bis(4-hydroxyphenyl)-1,1-ethane, bis(4-hydroxyphenyl)-1,1-isobutane, bis(4-hydroxy-2 or 3-tert-butyl-phenyl)-2,2-propane, bis(2-hydroxynaphthyl)methane, tetra(4-hydroxyphenyl)-1,1,2,2-ethane, 4,4'-dihydroxydiphenylsulfone, phenol novolac, cresol novolac, etc.

Of epoxy resins obtained by reacting a polyphenol compound with epichlorohydrin, those of the following Formula (6) derived from bisphenol A are preferable,

[Chem. 8]

(6)

wherein q is preferably 0 to 2.

Examples of commercial products of such epoxy resins include those available from Japan Epoxy Resins Co., Ltd. under the trade names of jER828EL and jER1001.

Bisphenol Compound (b13):

Examples of bisphenol compound (b13) include those represented by Formula (7) below,

[Chem. 9]

(7)

wherein $R^5$ and $R^6$ each represents a hydrogen atom or a $C_{1-6}$ alkyl group; and $R^7$, $R^8$, $R^9$, $R^{10}$, $R^{11}$, $R^{12}$, $R^{13}$, and $R^{14}$ each represents a hydrogen atom or a $C_{1-6}$ alkyl group.

Specific examples thereof include bis(4-hydroxyphenyl)-2,2-propane (bisphenol A) and bis(4-hydroxyphenyl)methane (bisphenol F).

In general, modified epoxy resin (A11) having an epoxy equivalent of 500 to 2,500 can be produced by mixing diepoxy compound (b11), epoxy resin (b12) having an epoxy equivalent of 170 to 500, and bisphenol compound (b13) to make these three compounds react in the presence of a suitably selected reaction catalyst such as dimethylbenzylamine, tributylamine and like tertiary amines; tetraethylammonium bromide, tetrabutylammonium bromide and like quaternary ammonium salts, at a reaction temperature of about 80 to 200° C., and preferably about 90 to 180° C., for 1 to 6 hours, and preferably 1 to 5 hours.

Examples of methods for producing modified epoxy resin (A11) are as follows (Methods 1 to 3).

1. A method in which diepoxy compound (b11), epoxy resin (b12) having an epoxy equivalent of 170 to 500, and bisphenol compound (b13) are all mixed and reacted with each other to produce epoxy resin (A11) having an epoxy equivalent of 500 to 2,500.
2. A method in which diepoxy compound (b11) and bisphenol compound (b13) are reacted to yield a reaction mixture, after which epoxy resin (b12) having an epoxy equivalent of 170 to 500 is added and reacted with the reaction mixture to produce epoxy resin (A11) having an epoxy equivalent of 500 to 2,500;
3. A method in which epoxy resin (b12) having an epoxy equivalent of 170 to 500 is reacted with bisphenol compound (b13) to yield a reaction mixture, after which diepoxy compound (b11) is added and reacted with the reaction mixture to produce epoxy resin (A11) having an epoxy equivalent of 500 to 2,500; etc. The reaction state can be traced by epoxy value.

In the production of modified epoxy resin (A11), the proportion of diepoxy compound (b11) is preferably 1 to 35 mass %, and more preferably 2 to 30 mass %, based on the total solids mass of the components for forming modified epoxy resin (A11), i.e., diepoxy compound (b11), epoxy resin (b12) having an epoxy equivalent of 170 to 500, and bisphenol compound (b13). The proportion in the above range is preferable in order to improve the water dispersibility of amino group-containing modified epoxy resin (A), electrodeposition coating applicability onto hot dip galvanized steel sheets, finish of a cationic electrodeposition coating film, in particular, finish at a dried film thickness of 15 μm.

Further, to improve electrodeposition coating applicability onto hot dip galvanized steel sheets, the anti-corrosion properties and finish of a cationic electrodeposition coating film, in particular, anti-corrosion properties and finish at a dried film thickness of 15 μm, it is preferable that the proportion of epoxy resin (b12) having an epoxy equivalent of 170 to 500 be 10 to 80 mass %, particularly 15 to 75 mass %, and the proportion of bisphenol compound (b13) be 10 to 60 mass %, particularly 15 to 50 mass %.

In the above production, an organic solvent may be optionally used. Examples thereof include toluene, xylene, cyclohexane, n-hexane and like hydrocarbon-based solvents; methyl acetate, ethyl acetate, butyl acetate and like ester-based solvents; acetone, methyl ethyl ketone, methyl isobutyl ketone, methyl amyl ketone and like ketone-based solvents; dimethyl formamide, dimethyl acetamide and like amide-based solvents; methanol, ethanol, n-propanol, isopropanol and like alcohol-based solvents; phenylcarbinol, methylphenylcarbinol and like aromatic alkyl alcohol-based solvents; ethylene glycol monobutyl ether, diethylene glycol monoethyl ether and like etheralcohol-based compounds; and mixtures thereof.

Amine Compound (A12):

Amino group-containing modified epoxy resin (A1) can be produced by subjecting modified epoxy resin (A11) to an addition reaction with amine compound (A12). As amine compound (A12), those described above can be used.

The proportion of each component used in the addition reaction of modified epoxy resin (A11) and amine compound (A12) is not strictly limited, and can be suitably determined according to the use etc. of the electrodeposition coating composition. The proportion of modified epoxy resin (A11) is 70 to 98 mass %, preferably 75 to 96 mass %; and the proportion of amine compound (A12) is 2 to 30 mass %, preferably 4 to 25 mass %, based on the total solids mass of modified epoxy resin (A11) and amine compound (A12), which are used in the production of amino group-containing modified epoxy resin (A1).

The addition reaction is usually carried out in a suitable solvent at 80 to 170° C., and preferably 90 to 150° C. for 1 to 6 hours, and preferably 1 to 5 hours. Examples of the solvent used in the above reaction include hydrocarbon-based solvents such as toluene, xylene, cyclohexane, n-hexane, etc.; ester-based solvents such as methyl acetate, ethyl acetate, butyl acetate, etc.; ketone-based solvents such as acetone, methyl ethyl ketone, methyl isobutyl ketone, methyl amyl ketone, etc.; amide-based solvents such as dimethylformamide, dimethylacetamide, etc.; alcohol-based solvents such as methanol, ethanol, n-propanol, iso-propanol, etc.; aromatic alkyl alcohol-based solvents such as phenyl carbinol, methyl phenyl carbinol, etc.; ether alcohol compounds such as ethylene glycol monobutyl ether, diethylene glycol monoethyl ether, etc.; mixtures thereof; etc.

Phenolic Hydroxy Group-Containing Resin (B)

To improve anti-corrosion properties and finish, especially, anti-corrosion properties and finish at a dried film thickness of 15 μm, the cationic electrodeposition coating composition of the present invention includes phenolic hydroxy group-containing resin (B).

Phenolic hydroxy group-containing resin (B) is obtainable by reacting the above-mentioned diepoxy compound (b11) and/or the above-mentioned epoxy resin (b12) having an epoxy equivalent of 170 to 500 with bisphenol compound (b13) at a equivalent ratio of [(epoxy groups in diepoxy compound (b11) and epoxy resin (b12))/[phenol groups in bisphenol compound (b13)] being 0.5 to 0.85, preferably 0.5 to 0.83, and more preferably 0.5 to 0.8.

Herein, diepoxy compound (b11) indicates, as explained above, compound (1) represented by Formula (1) and/or compound (2) represented by Formula (2).

As diepoxy compound (b11), epoxy resin (b12) having an epoxy equivalent of 170 to 500, and bisphenol compound (b13), those described in the section "Amino group-containing modified epoxy resin (A1)" can be used.

Phenolic hydroxy group-containing resin (B) can be produced by mixing diepoxy compound (b11) and/or epoxy resin (b12) having an epoxy equivalent of 170 to 500, and bisphenol compound (b13) to make these three compounds react in the presence of a suitably selected reaction catalyst such as dimethylbenzylamine, tributylamine and like tertiary amines; tetraethylammonium bromide, tetrabutylammonium bromide and like quaternary ammonium salts, at a reaction temperature of about 80 to 200° C., and preferably about 90 to 180° C., for 1 to 6 hours, and preferably 1 to 5 hours.

From the standpoint of improvement in finish and anti-corrosion properties, particularly, finish and anti-corrosion properties at a dried film thickness of 15 it is preferable that the thus obtained phenolic hydroxy group-containing resin (B) have a phenolic hydroxy equivalent of 20 to 112 mg KOH/g, particularly 25 to 110 mg KOH/g, and a number average molecular weight of 800 to 7,000, particularly 900 to 5,000.

Blocked Polyisocyanate Curing Agent (C)

When amino group-containing modified epoxy resin (A) and phenolic hydroxy group-containing resin (B) are used in combination with blocked polyisocyanate curing agent (C) in the cationic electrodeposition coating composition of the present invention, a heat-curable cationic electrodeposition coating composition can be obtained.

The aforementioned blocked polyisocyanate curing agent (C) is an almost stoichiometric amounts addition-reaction product of a polyisocyanate compound and an isocyanate blocking agent. Polyisocyanate compounds usable in blocked polyisocyanate curing agent (C) may be known compounds. Examples thereof include aromatic, aliphatic or alicyclic polyisocyanate compounds such as tolylene diisocyanate, xylylene diisocyanate, phenylene diisocyanate, diphenylmethane-2,2'-diisocyanate, diphenylmethane-2,4'-diisocyanate, diphenylmethane-4,4'-diisocyanate, crude MDI (polymethylene polyphenyl isocyanate), bis(isocyanatemethyl) cyclohexane, tetramethylene diisocyanate, hexamethylene diisocyanate, methylene diisocyanate, isophorone diisocyanate, etc.; cyclopolymers or biurets of these polyisocyanate compounds; and combinations thereof.

Specifically, tolylene diisocyanate, xylylene diisocyanate, phenylene diisocyanate, diphenylmethane-2,4'-diisocyanate, diphenylmethane-4,4'-diisocyanate, crude MDI, and like aromatic polisocyanate compounds are preferable in view of anti-corrosion properties.

The isocyanate blocking agent is added to isocyanate groups of a polyisocyanate compound to block the isocyanate groups. The blocked polyisocyanate compound obtained by such an addition is stable at room temperature; however, it is desirable that the blocking agent be dissociated to regenerate free isocyanate groups, when heated to a baking temperature of a coating film (usually about 100° C. to about 200° C.)

Examples of blocking agents usable in blocked polyisocyanate curing agent (C) include methylethylketoxime, cyclohexanone oxime and like oxime-based compounds; phenol, para-t-butylphenol, cresol and like phenol-based compounds; n-butanol, 2-ethylhexanol and like aliphatic alcohol compounds; phenylcarbinol, methylphenylcarbinol and like aromatic alkyl alcohol compounds; ethylene glycol monobutyl ether, diethylene glycol monoethyl ether and like ether alcohol-based compounds; ε-caprolactam, γ-butyrolactam and like lactam-based compounds; etc.

With regard to the cationic electrodeposition coating composition of the present invention, the proportion of amino group-containing modified epoxy resin (A) is 20 to 75 mass %, preferably 30 to 70 mass %, the proportion of phenolic hydroxy group-containing resin (B) is 5 to 50 mass %, preferably 5 to 40 mass %, and the proportion of blocked polyisocyanate curing agent (C) is 10 to 40 mass %, preferably 15 to 35 mass %, based on the total solids mass of the components (A), (B), and (C).

The above proportions are preferable to achieve excellent coating composition stability and to provide a coated article having excellent electrodeposition coating applicability onto hot dip galvanized steel sheets, and excellent anti-corrosion properties and a superior finish, particularly, excellent anti-corrosion properties and a superior finish at a dried film thickness of 15 μm.

In the production of a cationic electrodeposition coating composition containing amino group-containing modified epoxy resin (A) as a resin component, amino group-containing modified epoxy resin (A), phenolic hydroxy group-containing resin (B), and blocked polyisocyanate curing agent (C) are fully mixed, if necessary, with organic solvents and various additives, etc., such as surfactants, surface-adjusting agents, etc. to thereby prepare a preparation resin. The prepared preparation resin is rendered water-soluble or water-dispersible with organic carboxylic acid etc. to thereby obtain an emulsion.

The neutralization of the preparation resin may generally be performed using a known organic carboxylic acid; of these, acetic acid, formic acid, lactic acid, and mixtures thereof are preferable. Subsequently, a pigment dispersion paste is added to the emulsion, which is then adjusted using water to produce a cationic electrodeposition coating composition.

The above-mentioned pigment dispersion paste is a dispersion preliminarily comprising fine particles of a coloring pigment, a rust-preventive pigment, an extender pigment, etc., and may be prepared by, for example, mixing a resin for pigment dispersion, a neutralizer, a pigment compound, etc., and dispersing the resulting mixture in a dispersion mixer such as a ball mill, sand mill, pebble mill, or the like.

Known resins may be used as the above-mentioned resin for pigment dispersion. Examples thereof include base resins having hydroxy and cationic groups; resins such as tertiary amine-type epoxy resins, quaternary ammonium salt-type epoxy resins, tertiary sulfonium salt-type epoxy resins, etc.

There is no particular limitation to the aforementioned pigment compounds, and usable examples include coloring pigments such as titanium oxide, carbon black, colcothar, etc.; extender pigments such as clay, mica, baryta, calcium carbonate, silica, etc.; and rust-preventive pigments such as aluminum phosphomolybdate, aluminum tripolyphosphate, zinc oxide (zinc white), etc.

In order to inhibit corrosion or prevent rust, bismuth compounds may be used. Examples thereof include bismuth oxide, bismuth hydroxide, basic bismuth carbonate, bismuth nitrate, bismuth silicate, organic acid bismuth, etc.

In order to improve the curability of the coating films, organic tin compounds, such as dibutyltin dibenzoate, dioctyltin oxide, dibutyltin oxide, etc. may be used. However, in place of these organic tin compounds, rust-preventive pigments and/or bismuth compounds such as the above-mentioned zinc oxide (zinc white), etc. may also be used (in an increased amount), and/or refined for use, in order to improve the curability of the coating films. The amount of the pigment compounds used is preferably 1 to 100 parts by mass, particularly 10 to 50 parts by mass, per 100 parts by mass of the total solids of the base resin and the curing agent.

Examples of articles on which the cationic electrodeposition coating composition of the present invention is coated include automobile bodies, parts for two-wheeled vehicles, home appliances and other appliances, etc. Articles are not particularly limited as long as they are made of metal.

Examples of metal steel sheets to be coated include cold-rolled steel sheets, hot dip galvanized steel sheets, electrogalvanized steel sheets, electrolytic zinc-iron duplex plated steel sheets, organic composite plated steel sheets, aluminium substrates, magnesium substrates, and the like. If necessary, these metal sheets may be washed using alkali degreasing etc., and subjected to surface treatment such as phosphate chemical conversion treatment, chromate treatment, etc.

The cationic electrodeposition coating composition may be applied on a desired substrate surface by electrodeposition coating. Cationic electrodeposition coating is generally performed by adjusting the temperature of an electrodeposition bath to usually 15 to 35° C., and applying a current at a load voltage of 100 to 400V using a to-be-coated article as a cathode. The electrodeposition bath comprises an electrodeposition coating composition diluted with deionized water or the like to a solids content of about 5 to about 40 mass %, and whose pH has been adjusted to 5.5 to 9.0. In general, after the electrodeposition coating, the article is fully washed with ultrafiltrate (UF filtrate), reverse osmosis water (RO water), industrial water, deionized water or the like to remove the cationic electrodeposition coating composition excessively adhered to the coated object.

The thickness of the electrodeposition coating film is not particularly limited, but is generally 5 to 40 μm, and preferably 12 to 30 μm, based on the thickness of the dried coating film. The baking and drying of the coating film is performed by heating the electrodeposition coating film at a surface temperature of the coated article of 110 to 200° C., preferably 140 to 180° C. for 10 to 180 minutes, preferably 20 to 50 minutes by means of a dryer such as an electric hot-air dryer, gas hot-air dryer or the like. By such baking and drying, a cured coating film is obtained.

The cationic electrodeposition coating film obtained by baking and drying as above has a center line mean roughness (Ra) of 0.20 μm or less, preferably 0.05 to 0.18 μm (at a cut off of 0.8 mm) at a dried film thickness of 15 μm, and has an excellent finish. The center line mean roughness (Ra) in the roughness curve is defined by JIS B 601.

EXAMPLES

The present invention is explained in detail below with reference to the production examples, examples, and comparative examples; however, the present invention is not limited thereto. In the examples, "parts" "and "%" are by mass.
Production of Amino Group-Containing Modified Epoxy Resin (A)

Production Example 1

Production Example of Base Resin No. 1

A 2-liter flask equipped with a thermometer, a reflux condenser, and a stirrer was charged with 185 parts of Denacol EX-821 (Note 1), 950 parts of jER828 EL (Note 5), 456 parts of bisphenol A, and 0.8 parts of tetrabutylammonium bromide. The mixture was allowed to react at 160° C. until the epoxy equivalent became 800.

Next, 359 parts of methyl isobutyl ketone, and 150 parts of diethanol amine, and 127 parts of a ketimine of diethylenetriamine with methyl isobutyl ketone (purity: 84%, methyl isobutyl ketone solution) were added to the mixture, and then allowed to react at 120° C. for 4 hours. The solution of base resin No. 1, which was an amino group-containing modified epoxy resin with a resin solids content of 80% was thus obtained. Base resin No. 1 had an amine value of 69 mg KOH/g, and a number average molecular weight of 2,400.

Production Example 2

Production Example of Base Resin No. 2

A 2-liter flask equipped with a thermometer, a reflux condenser, and a stirrer was charged with 471 parts of Denacol EX-931 (Note 2), 950 parts of jER828 EL (Note 5), 456 parts of bisphenol A, and 0.8 parts of tetrabutylammonium bromide. The mixture was allowed to react at 160° C. until the epoxy equivalent became 950.

Next, 430 parts of methyl isobutyl ketone, and 150 parts of diethanol amine, and 127 parts of a ketimine of diethylenetriamine with methyl isobutyl ketone (purity: 84%, methyl isobutyl ketone solution) were added to the mixture, and then allowed to react at 120° C. for 4 hours. The solution of base resin No. 2, which was an amino group-containing modified epoxy resin with a resin solids content of 80% was thus obtained. Base resin No. 2 had an amine value of 60 mg KOH/g, and a number average molecular weight of 2,500.

Production Example 3

Production Example of Base Resin No. 3

A 2-liter flask equipped with a thermometer, a reflux condenser, and a stirrer was charged with 340 parts of Glyci-ale BPP-350 (Note 4), 950 parts of jER828 EL (Note 5), 456 parts of bisphenol A, and 0.8 parts of tetrabutylammonium bromide. The mixture was allowed to react at 160° C. until the epoxy equivalent became 900.

Next, 400 parts of methyl isobutyl ketone, 150 parts of diethanol amine, and 127 parts of a ketimine of diethylenetriamine with methyl isobutyl ketone (purity: 84%, methyl isobutyl ketone solution) were added to the mixture, and then allowed to react at 120° C. for 4 hours. The solution of base resin No. 3, which was an amino group-containing modified epoxy resin with a resin solids content of 80% was thus obtained. Base resin No. 3 had an amine value of 64 mg KOH/g, and a number average molecular weight of 2,500.

Production Example 4

Production Example of Base Resin No. 4

A 2-liter flask equipped with a thermometer, a reflux condenser, and a stirrer was charged with 162 parts of Glyci-ale PP-300P (Note 3), 1,000 parts of jER828 EL (Note 5), 440 parts of bisphenol A, and 1.6 parts of tetrabutylammonium bromide. The mixture was allowed to react at 160° C. until the epoxy equivalent became 800.

Next, 430 parts of methyl isobutyl ketone, and 130 parts of 2-methylamino-1-ethanol were added to the mixture, and then allowed to react at 100° C. for 4 hours. The solution of base resin No. 4, which was an amino group-containing modified epoxy resin with a resin solids content of 80% was thus obtained.

Base resin No. 4 had an amine value of 58 mg KOH/g, and a number average molecular weight of 2,200.

Production Example 5

Production Example of Base Resin No. 5

A 2-liter flask equipped with a thermometer, a reflux condenser, and a stirrer was charged with 162 parts of Glyci-ale PP-300P (Note 3), 1,000 parts of jER828 EL (Note 5), 440 parts of bisphenol A, and 1.6 parts of tetrabutylammonium bromide. The mixture was allowed to react at 160° C. until the epoxy equivalent became 800.

Next, 450 parts of methyl isobutyl ketone and 210 parts of 4-ethylamino-1-butanol were added to the mixture, and then allowed to react at 100° C. for 4 hours. The solution of base resin No. 5, which was an amino group-containing modified epoxy resin with a resin solids content of 80% was thus obtained. Base resin No. 5 had an amine value of 56 mg KOH/g, and a number average molecular weight of 2,200.

Table 1 shows the formulations and the characteristic values of base resins Nos. 1 to 5 obtained in Production Examples 1 to 5.

TABLE 1

| | | | | Production Example 1 | Production Example 2 | Production Example 3 | Production Example 4 | Production Example 5 |
|---|---|---|---|---|---|---|---|---|
| Base resin Formulation | | | | No. 1 | No. 2 | No. 3 | No. 4 | No. 5 |
| | (A11) | (b11) | Denacol EX-821 (Note 1) | 185 | | | | |
| | | | Denacol EX-931 (Note 2) | | 471 | | | |
| | | | Glyci-ale PP-300P (Note 3) | | | | 162 | 162 |
| | | | Glyci-ale BPP-350 (Note 4) | | | 340 | | |
| | | (b12) | jER828EL (Note 5) | 950 | 950 | 950 | 1,000 | 1,000 |
| | | (b13) | Bisphenol A | 456 | 456 | 456 | 440 | 440 |
| | | Catalyst | Tetrabutylammonium bromide | 0.8 | 0.8 | 0.8 | 1.6 | 1.6 |
| | | Solvent | Methyl isobutyl ketone | 359 | 430 | 400 | 430 | 450 |
| | (A12) | | Diethanol amine | 150 | 150 | 150 | | |
| | | | Ketimine of diethylenetriamine with methyl isobutyl ketone | 127 | 127 | 127 | | |
| | | | 2-Methylamino-1-ethanol | | | | 130 | |
| | | | 4-Ethylamino-1-butanol | | | | | 210 |
| Characteristic value | Amine value (mg KOH/g) | | | 60 | 60 | 64 | 58 | 56 |
| | Number average molecular weight | | | 2,400 | 2,500 | 2,500 | 2,200 | 2,200 |

The numerals in the formulations are by parts.

(Note 1) Denacol EX-821: trade name of an epoxy resin (diepoxy compound (b11)) produced by Nagase Chemtex Corporation; epoxy equivalent: 185; corresponding to compound (2) ($R^2$=hydrogen atom, X=1, Y=4)

(Note 2) Denacol EX-931: trade name of an epoxy resin (diepoxy compound (b11)) produced by Nagase Chemtex Corporation; epoxy equivalent: 471; corresponding to compound (2) ($R^2$=$CH_3$, X=1, Y=11)

(Note 3) Glyci-ale PP-300P: trade name of an epoxy resin (diepoxy compound (b11)) produced by Sanyo Chemical Industries, Ltd.; epoxy equivalent: 296; corresponding to compound (2) ($R^2$=$CH_3$, X=1, Y=7)

(Note 4) (2)Glyci-ale BPP-350: trade name of an epoxy resin (diepoxy compound (b11)) produced by Sanyo Chemical Industries, Ltd.; epoxy equivalent: 340; corresponding to compound (1) ($R^1$=$CH_3$, m+n=3)

(Note 5) jER828EL: trade name of an epoxy resin (b12) produced by Japan Epoxy Resin; epoxy equivalent: 190; number average molecular weight: 380

Synthesis Example 1

Production of Xylene-Formaldehyde Resin

A 2-liter separable flask equipped with a thermometer, a reflux condenser, and a stirrer was charged with 480 parts of 50% formalin, 110 parts of phenol, 202 parts of 98% industrial sulfuric acid, and 424 parts of m-xylene. The resulting mixture was allowed to react at 84 to 88° C. for 4 hours. After completion of the reaction, the reaction mixture was allowed to stand to separate a resin phase and a sulfuric acid aqueous phase. After the resin phase was washed with water 3 times, unreacted m-xylene was removed under the conditions of 20 to 30 mmHg and 120 to 130° C. for 20 minutes. As a result, 480 parts of a phenol-modified xylene-formaldehyde resin having a viscosity of 1,050 mPa·s (25° C.) was obtained.

Production Example 6

Production Example of Base Resin No. 6

A flask was charged with 1,140 parts of jER828 EL (Note 5), 456 parts of bisphenol A, and 0.2 parts of dimethylbenzylamine. The mixture was allowed to react at 130° C. until the epoxy equivalent became 820.

Next, 420 parts of methylisobutylketone, 300 parts of the xylene-formaldehyde resin obtained in Synthesis Example 1, 95 parts of diethanol amine, and 127 parts of a ketimine of diethylenetriamine with methyl isobutyl ketone (purity: 84%, methyl isobutyl ketone solution) were added to the mixture, and then allowed to react at 120° C. for 4 hours. The solution of base resin No. 6, which was an amino group-containing modified epoxy resin with a resin solids content of 80% was thus obtained. Base resin No. 6 had an amine value of 47 mg KOH/g, and a number average molecular weight of 2,500.

Production Example of Phenolic Hydroxy Group-Containing Resin (B)

Production Example 7

Production of Phenolic Hydroxy Group-Containing Resin Solution No. 1

A 2-liter flask equipped with a thermometer, a reflux condenser, and a stirrer was charged with 730 parts of jER828EL (Note 5), 670 parts of bisphenol A, and 1.6 parts of tetrabutylammonium bromide. The mixture was allowed to react at 160° C. until the epoxy value became 0.02 or less.

Next, 226 parts of methyl isobutyl ketone was added to the mixture to obtain the solution of phenolic hydroxy group-containing resin No. 1 with a resin solids content of 80%. Phenolic hydroxy group-containing resin No. 1 had a phenolic hydroxy value of 80 mg KOH/g, and a number average molecular weight of 1,400. The equivalent ratio of [epoxy groups in epoxy resin (b12)]/[phenol groups in bisphenol compound (b13)]=0.65.

Production Example 8

Production of Phenolic Hydroxy Group-Containing Resin Solution No. 2

A 2-liter flask equipped with a thermometer, a reflux condenser, and a stirrer was charged with 592 parts of Glyci-ale PP-300P (Note 3), 380 parts of jER828EL (Note 5), 684 parts of bisphenol A, and 1.6 parts of tetrabutylammonium bromide. The mixture was allowed to react at 160° C. until the epoxy value became 0.02 or less.

Next, 414 parts of methyl isobutyl ketone was added to the mixture to obtain the solution of phenolic hydroxy group-containing resin No. 2 with a resin solids content of 80%. Phenolic hydroxy group-containing resin No. 2 had a phenolic hydroxy value of 68 mg KOH/g, and a number average molecular weight of 1,800.

The equivalent ratio of [epoxy groups in diepoxy compound (b11) and epoxy resin (b12)]/[phenol groups in bisphenol compound (b13)]=0.67.

Production Example 9

Production of Phenolic Hydroxy Group-Containing Resin Solution No. 3

A 2-liter flask equipped with a thermometer, a reflux condenser, and a stirrer was charged with 680 parts of Glyci-ale BPP-350 (Note 4), 456 parts of bisphenol A, and 1.6 parts of tetrabutylammonium bromide. The mixture was allowed to react at 160° C. until the epoxy value became 0.02 or less.

Next, 284 parts of methyl isobutyl ketone was added to the mixture to obtain the solution of phenolic hydroxy group-containing resin No. 3 with a resin solids content of 80%. Phenolic hydroxy group-containing resin No. 3 had a phenolic hydroxy value of 99 mg KOH/g, a number average molecular weight of 1,200.

The equivalent ratio of [epoxy groups in diepoxy compound (b11)]/[phenol groups in bisphenol compound (b13)] was 0.50.

Production of Blocked Polyisocyanate Curing Agent (C)

Production Example 10

Production Example of Curing Agent 270 parts of Cosmonate M-200 (trade name of crude MDI produced by Mitsui Chemicals, Inc.) and 127 parts of methyl isobutyl ketone were added to a reaction vessel and heated to 70° C. 236 parts of ethylene glycol monobutyl ether was added thereto dropwise over 1 hour, and the mixture was heated to 100° C. The mixture was sampled over time while the temperature was maintained; when no absorption by unreacted isocyanate groups was observed by infrared absorption spectrometry, the curing agent with a resin solids content of 80% was obtained.

Production of Emulsion

Production Example 11

Production Example of Emulsion No. 1

62.5 parts (solids content: 50 parts) of base resin No. 1 obtained in Production Example 1, 25.0 parts of phenolic hydroxy group-containing resin solution No. 1 obtained in Production Example 7, and 37.5 parts (solids content: 30 parts) of the curing agent obtained in Production Example 10 were mixed. 15 parts of 10% acetic acid was added thereto and uniformly stirred. Thereafter, 179.0 parts of deionized water was added dropwise over about 15 minutes with vigorous stirring to thereby obtain emulsion No. 1 with a solids content of 34%.

Production Examples 12 to 20

Production Examples of Emulsions Nos. 2 to 10

Emulsions Nos. 2 to 10 were obtained in the same manner as in Production Example 11, except that the formulations shown in Table 2 were used.

TABLE 2

| | | | Production Example 11 | Production Example 12 | Production Example 13 | Production Example 14 | Production Example 15 |
|---|---|---|---|---|---|---|---|
| Emulsion Formulation | Component A | Base resin No. 1 (solids content 80%) | No. 1 62.5 (50) | No. 2 | No. 3 | No. 4 | No. 5 |
| | | Base resin No. 2 (solids content 80%) | | 62.5 (50) | | | |
| | | Base resin No. 3 (solids content 80%) | | | 62.5 (50) | | |
| | | Base resin No. 4 (solids content 80%) | | | | 62.5 (50) | |
| | | Base resin No. 5 (solids | | | | | 62.5 (50) |

TABLE 2-continued

| | | | | | | | |
|---|---|---|---|---|---|---|---|
| | | content 80%) | | | | | |
| | | Base resin No. 6 (solids content 80%) | | | | | |
| | Component B | Phenolic hydroxy group-containing resin solution No. 1 (solids content 80%) | 25.0 (20) | 25.0 (20) | 25.0 (20) | 25.0 (20) | 25.0 (20) |
| | | Phenolic hydroxy group-containing resin solution No. 2 (solids content 80%) | | | | | |
| | | Phenolic hydroxy group-containing resin solution No. 3 (solids content 80%) | | | | | |
| | Component C | Curing agent | 37.5 (30) | 37.5 (30) | 37.5 (30) | 37.5 (30) | 37.5 (30) |
| | 10% acetic acid | | 15.0 | 15.0 | 15.0 | 15.0 | 15.0 |
| | Deionized water | | 179.0 | 179.0 | 179.0 | 179.0 | 179.0 |
| Emulsion (solids content 34%) | | | 294.0 (100) | 294.0 (100) | 294.0 (100) | 294.0 (100) | 294.0 (100) |

| | | | Production Example 16 | Production Example 17 | Production Example 18 | Production Example 19 | Production Example 20 |
|---|---|---|---|---|---|---|---|
| Emulsion Formulation | Component A | Base resin No. 1 (solids content 80%) | No. 6 | No. 7 | No. 8 | No. 9 | No. 10 |
| | | Base resin No. 2 (solids content 80%) | | 75.0 (60) | 43.8 (35) | 62.5 (50) | 62.5 (50) |
| | | Base resin No. 3 (solids content 80%) | | | | | |
| | | Base resin No. 4 (solids content 80%) | | | | | |
| | | Base resin No. 5 (solids content 80%) | | | | | |
| | | Base resin No. 6 (solids content 80%) | 62.5 (50) | | | | |

TABLE 2-continued

| | | | | | | |
|---|---|---|---|---|---|---|
| Component B | Phenolic hydroxy group-containing resin solution No. 1 (solids content 80%) | 25.0 (20) | 12.5 (10) | 43.8 (35) | | |
| | Phenolic hydroxy group-containing resin solution No. 2 (solids content 80%) | | | | 25.0 (20) | |
| | Phenolic hydroxy group-containing resin solution No. 3 (solids content 80%) | | | | | 25.0 (20) |
| Component C | Curing agent | 37.5 (30) | 37.5 (30) | 37.5 (30) | 37.5 (30) | 37.5 (30) |
| 10% acetic acid | | 15.0 | 12.5 | 21.4 | 15.0 | 15.0 |
| Deionized water | | 179.0 | 169.0 | 191.3 | 179.0 | 179.0 |
| Emulsion (solids content 34%) | | 294.0 (100) | 294.0 (100) | 294.0 (100) | 294.0 (100) | 294.0 (100) |

The parenthesized numerals in the formulations denote the solids content.

Production Example 21

Production Example of Emulsion No. 11

87.5 parts (solids content: 70 parts) of base resin No. 2 obtained in Production Example 2, and 37.5 parts (solids content: 30 parts) of the curing agent obtained in Production Example 10 were mixed. 13.5 parts of 10% acetic acid was added thereto and uniformly stirred. Thereafter, 155.5 parts of deionized water was added dropwise over about 15 minutes with vigorous stirring to thereby obtain emulsion No. 11 with a solids content of 34%.

Production Example 22

Production Example of Emulsion No. 12

Emulsions No. 12 was obtained in the same manner as in Production Example 21, except that the formulations shown in Table 3 were used.

TABLE 3

| | | | Production example 21 | Production example 22 |
|---|---|---|---|---|
| Emulsion Formulation | Component A | Base resin No. 2 (Solids content: 80%) | No. 11 87.5 (70) | No. 12 62.5 (50) |

TABLE 3-continued

| | | Production example 21 | Production example 22 |
|---|---|---|---|
| Resol phenolic resin | Shonol BKS377F (Solids content: 50%) (Note 7) | | 40.0 (20) |
| Component C | Curing agent | 37.5 (30) | 37.5 (30) |
| 10% acetic acid | | 13.5 | 15.0 |
| Deionized water | | 155.5 | 139.0 |
| Emulsion | | 294.0 (100) | 294.0 (100) |

The parenthesized numerals in the formulations denote the solids content.

(Note 7) Shonol BKS377F: trade name of resol phenolic resin produced by Showa Highpolymer Co., Ltd. Number average molecular weight: 650

Production Example 23

Production Example of Resin for Pigment Dispersion 1,010 parts of jER828EL (See Note 5) was blended with 390 parts of bisphenol A, 240 parts of PLACCEL 212 (trade name of polycaprolactonediol produced by Daicel Chemical Industries; weight average molecular weight: about 1,250) and 0.2 parts of dimethylbenzylamine, and the mixture was allowed to react at 130° C. until the epoxy equivalent became about 1,090.

Next, 134 parts of dimethylethanolamine and 150 parts of a 90% aqueous lactic acid solution were added to the mixture, and then allowed to react at 120° C. for 4 hours. Methyl isobutyl ketone was subsequently added to adjust the solids content, thereby obtaining an ammonium salt-type resin for pigment dispersion having a solids content of 60%. The resin for pigment dispersion had an ammonium salt concentration of 0.78 mmol/g.

Production Example 24, and 297.6 parts of deionized water were added. Cationic electrodeposition coating composition No. 1 with a solids content of 20% was thus obtained.

Examples 2 to 10 and Comparative Examples 1 and 2

Cationic electrodeposition coating compositions Nos. 2 to 12 were produced in the same manner as in Example 1, except that the formulations shown in Tables 4 and 5 were used.

TABLE 4

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Cationic electrodeposition coating composition | | No. 1 | No. 2 | No. 3 | No. 4 | No. 5 | No. 6 | No. 7 | No. 8 | No. 9 | No. 10 |
| Formulation | Emulsion No. 1 | 294.0 (100) | | | | | | | | | |
| | Emulsion No. 2 | | 294.0 (100) | | | | | | | | |
| | Emulsion No. 3 | | | 294.0 (100) | | | | | | | |
| | Emulsion No. 4 | | | | 294.0 (100) | | | | | | |
| | Emulsion No. 5 | | | | | 294.0 (100) | | | | | |
| | Emulsion No. 6 | | | | | | 294.0 (100) | | | | |
| | Emulsion No. 7 | | | | | | | 294.0 (100) | | | |
| | Emulsion No. 8 | | | | | | | | 294.0 (100) | | |
| | Emulsion No. 9 | | | | | | | | | 294.0 (100) | |
| | Emulsion No. 10 | | | | | | | | | | 294.0 (100) |
| | Pigment dispersion paste | 52.4 (28.8) | 52.4 (28.8) | 52.4 (28.8) | 52.4 (28.8) | 52.4 (28.8) | 52.4 (28.8) | 52.4 (28.8) | 52.4 (28.8) | 52.4 (28.8) | 52.4 (28.8) |
| | Deionized water | 297.6 | 297.6 | 297.6 | 297.6 | 297.6 | 297.6 | 297.6 | 297.6 | 297.6 | 297.6 |
| Cationic electrodeposition coating composition Solids content: 20% | | 644.0 (128.8) | 644.0 (128.8) | 644.0 (128.8) | 644.0 (128.8) | 644.0 (128.8) | 644.0 (128.8) | 644.0 (128.8) | 644.0 (128.8) | 644.0 (128.8) | 644.0 (128.8) |

The numerals denote the amount of the ingredient used, and the parenthesized numerals denote the solids content.

Production Example 24

Production Example of Pigment Dispersion Paste 8.3 parts (solids content: 5 parts) of the resin for pigment dispersion having a solids content of 60% obtained in Production Example 23, 14.5 parts of titanium oxide, 7.0 parts of refined clay, 0.3 parts of carbon black, 1 part of dioctyltin oxide, 1 part of bismuth hydroxide, and 20.3 parts of deionized water were added into a ball mill and dispersed for 20 hours. The pigment dispersion paste with a solids content of 55% was thus obtained.

Cationic Electrodeposition Coating Composition

Example 1

294 parts (solids content: 100 parts) of emulsion No. 1 obtained in Production Example 11, 52.4 parts (solids content: 28.8 parts) of 55% pigment dispersion paste obtained in

TABLE 5

| | | Comparative Example 1 | Comparative Example 2 |
|---|---|---|---|
| Cationic electrodeposition coating composition | | No. 11 | No. 12 |
| Formulation | Emulsion No. 11 | 294 (100) | |
| | Emulsion No. 12 | | 294 (100) |
| | Pigment dispersion paste | 52.4 (28.8) | 52.4 (28.8) |
| | Deionized water | 297.6 | 297.6 |
| Cationic electrodeposition coating composition Solids content 20% | | 644 (128.8) | 644 (128.8) |

The numerals denote the amount of the ingredient used, and the parenthesized numerals denote the solids content.

Preparation of Test Plates

Each of the cationic electrodeposition coating compositions obtained in the Examples and Comparative Examples was applied by electrodeposition to a cold-rolled steel sheet (150 mm (length)×70 mm (width)×0.8 mm (thickness); center line mean roughness (Ra): 0.8) treated by chemical conversion with Palbond #3020 (trade name of zinc phosphate treatment agent produced by Nihon Parkerizing Co., Ltd.) to a dried film thickness of 15 μm. Test plates were thus obtained.

Tables 6 and 7 show the test results obtained using the resulting test plates.

voltage was adjusted so that the dried thickness of the coating film on the outer surface became 15 μm. throwing powers were evaluated based on the dried thickness of the coating films on the outer surface and the inner surface, and the amount of deposition (%). Amount of deposition (%)=(dried thickness of the coating film on the inner surface/dried thickness of the coating film on the outer surface×100). The higher the amount of deposition (%), the better.

TABLE 6

|  |  |  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| Cationic electrodeposition coating composition |  |  | No. 1 | No. 2 | No. 3 | No. 4 | No. 5 | No. 6 | No. 7 | No. 8 | No. 9 | No. 10 |
| Single-layer electrodeposition coating film | Throwing power (Note 8) | Surface G (μm) | 9 | 9 | 9 | 9 | 9 | 10 | 9 | 9 | 9 | 9 |
|  |  | Surface A (μm) | 15 | 15 | 15 | 15 | 15 | 15 | 15 | 15 | 15 | 15 |
|  |  | % | 60 | 60 | 60 | 60 | 60 | 67 | 60 | 60 | 60 | 60 |
|  | Electrodeposition coating applicability onto hot dip galvanized steel sheets (Note 9) |  | A | A | A | A | A | B | A | B | A | A |
|  | Surface roughness of electrodeposition coating film (Note 10) | Ra | A | B | A | A | A | B | A | B | A | A |
|  | Anti-corrosion properties (Note 11) |  | B | A | B | B | B | A | B | A | B | B |
|  | Comprehensive evaluation |  | A | A | A | A | A | A | A | A | A | A |

TABLE 7

|  |  |  | Comp. Ex. 1 | Comp. Ex. 2 |
|---|---|---|---|---|
| Cationic electrodeposition coating composition |  |  | No. 11 | No. 12 |
| Single-layer electrodeposition coating film | throwing power (Note 8) | Surface G (μm) | 9 | 7 |
|  |  | Surface A (μm) | 15 | 15 |
|  |  | % | 60 | 47 |
|  | Electrodeposition coating applicability onto hot dip galvanized steel sheets (Note 9) |  | A | B |
|  | Surface roughness of electrodeposition coating film (Note 10) | Ra | A | C |
|  | Anti-corrosion properties (Note 11) |  | C | B |
|  | Comprehensive evaluation |  | C | D |

(Note 8): Throwing power

Figure 1:
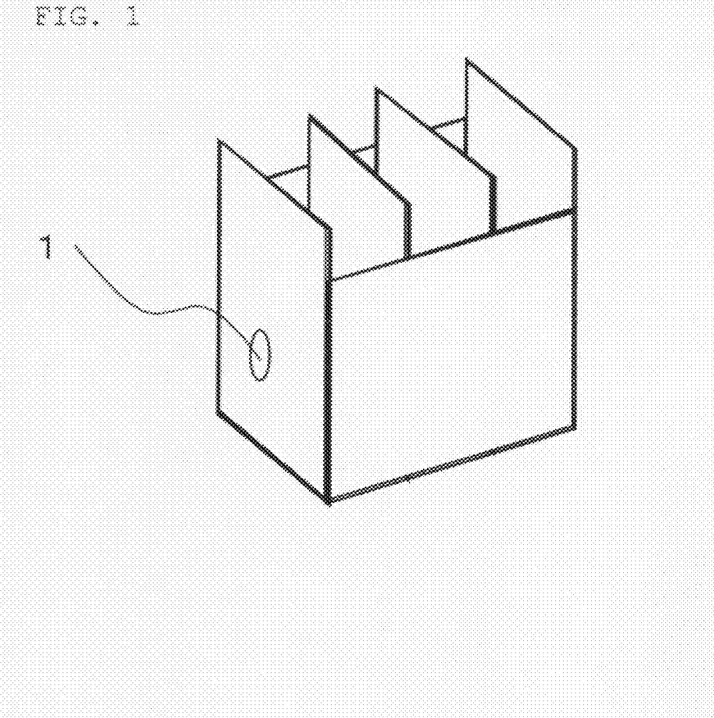
FIG. 1 shows a model structure that represents the "four-sheet box for throwing power evaluation" used in the throwing power evaluation.
Figure 2:
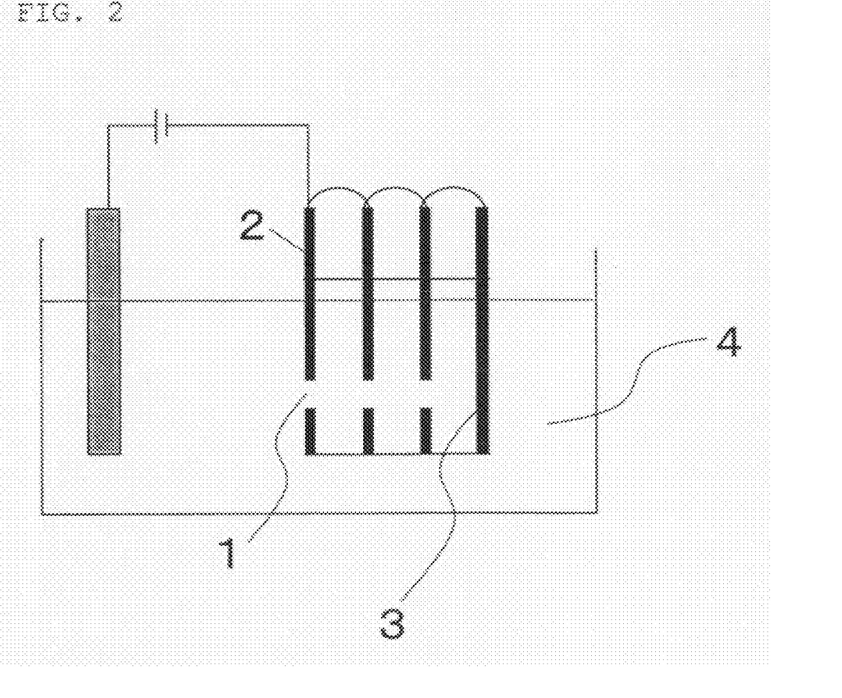
FIG. 2 shows the condition of the electrodeposition coating in the throwing power evaluation.

In a four-sheet box for throwing power (see FIG. 1), 8 mm-diameter holes were made, and four steel sheets were positioned at 2 cm intervals and connected as shown in FIG. 2. Of the four steel sheets shown in FIG. 2, the left surface of the outermost left steel sheet was called "surface A" and the right surface was called "surface B". Similarly, the left and right surfaces of the second steel sheet from the left were called "surface C" and "surface D", respectively; the left and right surfaces of the third steel sheet from the left were called "surface E" and "surface F", respectively; and the left and right surfaces of the outermost right steel sheet were called "surface G" and "surface H", respectively. Of these, the surface A was referred to as the outer surface, and the surface G was referred to as the inner surface.

Electrodeposition coating was performed on the device shown in FIG. 2 under the following conditions: coating bath temperature: 30° C.; distance between surface A and the electrode: 10 cm; time for applying current: 3 minutes. The (Note 9): Electrodeposition coating applicability onto hot dip galvanized steel sheets A hot dip galvanized steel sheet (0.8 mm×150 mm×70 mm) treated by chemical conversion with Palbond #3020 (trade name of a zinc phosphate treatment agent produced by Nihon Parkerizing Co., Ltd.) was immersed for use as a cathode in a bath containing an electrodeposition coating composition (30° C.). Electrodeposition coating was performed by adjusting the current application time at a voltage of 210V, thereby obtaining a 15 μm coating film. The number of pinholes was counted in 10×10 cm of the test piece obtained by heat-curing the resulting coating film at 170° C. for 20 minutes.

A: No pinhole.
B: One small pinhole (gas pinhole) was observed. However, since the pinhole was small enough to be sealed by an intermediate coating film, there were no problems.
C: 2 to 5 pinholes.
D: 10 or more pinholes.

(Note 10): Surface roughness of electrodeposition coating film

The center line mean roughness (Ra) of each of the electrodeposition coating films (dried film thickness: 15 μm) obtained in the Examples and Comparative Examples was measured using Surfcom 301 (trade name of a surface roughness measuring instrument produced by Mitsutoyo Corporation) according to JIS B 0601 (Definition and Indication of Surface Roughness, 1982). The smaller the Ra, the better. The surface roughness of each of the electrodeposition coating films was evaluated by "center line mean roughness (Ra)" according to the following criteria:

A: Ra was less than 0.20.
B: Ra was not less than 0.20 and less than 0.50.
C: Ra was not less than 0.50 and less than 0.70.
D: Ra was not less than 0.70.

(Note 11): Anti-corrosion properties

Each of the test plates containing a cationic electrodeposition coating film (dried film thickness: 15 μm) obtained in the Examples and Comparative Examples was cross-cut with a knife so that the cut reached the substrate. The test plate was then subjected to a salt spray test at 35° C. for 840 hours in accordance with JIS Z-2371. Anti-corrosion properties were rated based on the width of rust or blister resulting from the cut portion according to the following criteria:
A: The maximum width of rust or blister resulting from the cut was not more than 2.0 mm (on one side).
B: The maximum width of rust or blister from the cut was more than 2.0 mm and not more than 3.0 mm (on one side).
C: The maximum width of rust or blister from the cut was more than 3.0 mm and not more than 3.5 mm (on one side).
D: The maximum width of rust or blister from the cut was more than 3.5 mm (on one side).

Comprehensive Evaluation:

In the field of cationic electrodeposition coating compositions to which the present invention belongs, it is extremely important that compositions excel in terms of the following properties, i.e., throwing power, electrodeposition coating applicability onto hot dip galvanized steel sheets, surface roughness of the electrodeposition coating film, and anti-corrosion properties. Specifically, it is necessary that the amount of deposition (%) be at least 60%, and that all of the other properties be rated as A or B. The other properties being rated as A is more preferable.

Hence, each of the cationic electrodeposition coating compositions was comprehensively evaluated according to the following criteria:
A: The amount of deposition was at least 60%, and the other three properties were rated as either A or B (including at least one A).
B: The amount of deposition was at least 60%, and the other three properties were all rated as B.
C: The amount of deposition was at least 50% and less than 60%, and the other three properties were rated as A, B or C; or the amount of deposition was at least 60%, and the other three properties were rated as A, B, or C (including at least one C).
D: The amount of deposition was less than 50%; or the other three properties were rated as A, B, C, or D (including at least one D).

INDUSTRIAL APPLICABILITY

The present invention can provide a coated article that has excellent anti-corrosion properties and a superior finish.

EXPLANATION OF NUMERALS

1. Hole (8 mm in diameter) on the outer surface (surface A) of the four-sheet box for throwing power evaluation.
2. Outer surface (surface A) of the four-sheet box for throwing power evaluation.
3. Inner surface (surface G) of the four-sheet box for throwing power evaluation.
4. Bath containing the electrodeposition coating composition.

The invention claimed is:
1. A cationic electrodeposition coating composition comprising:
   amino group-containing modified epoxy resin (A),
   phenolic hydroxy group-containing resin (B), and
   blocked polyisocyanate curing agent (C),
      said component (A) being contained in an amount of 20 to 75 mass %, said component (B) being contained in an amount of 5 to 50 mass %, and said component (C) being contained in an amount of 10 to 40 mass %, based on the total solids mass of said components (A), (B), and (C),
   said phenolic hydroxy group-containing resin (B) being obtainable by reacting diepoxy compound (b11) and/or epoxy resin (b12) having an epoxy equivalent of 170 to 500 with bisphenol compound (b13) at an equivalent ratio of [epoxy groups in said diepoxy compound (b11) and epoxy resin (b12)]/[phenol groups in said bisphenol compound (b13)]=0.5 to 0.85,
   said diepoxy compound (b11) being compound (1) represented by Formula (1),

[Chem. 1]

wherein $R^1$ is the same or different, and each represents a hydrogen atom or $C_{1-6}$ alkyl group; and
m and n, which represent the number of repeating units of a portion having an alkylene oxide structure, are integers where m+n=1 to 20, and/or
compound (2) represented by Formula (2),

[Chem. 2]

wherein $R^2$ is the same or different, and each represents a hydrogen atom or $C_{1-6}$ alkyl group; X represents an integer of 1 to 9; and Y represents an integer of 1 to 50.

2. The cationic electrodeposition coating composition according to claim 1, wherein amino group-containing modified epoxy resin (A) is amino group-containing modified epoxy resin (A1) obtainable by reacting modified epoxy resin (A11) having an epoxy equivalent of 500 to 2,500 with amine compound (A12),
   wherein said modified epoxy resin (A11) is obtainable by reacting diepoxy compound (b11), epoxy resin (b12) having an epoxy equivalent of 170 to 500, and bisphenol compound (b13).

3. The cationic electrodeposition coating composition according to claim 2, wherein modified epoxy resin (A11) comprises said diepoxy compound (b11), said epoxy resin (b12), and said bisphenol compound (b13) in amounts of 1 to 35 mass %, 10 to 80 mass %, and 10 to 60 mass %, respectively, based on the total solids mass of said diepoxy compound (b11), epoxy resin (b12), and bisphenol compound (b13).

4. The cationic electrodeposition coating composition according to claim 2, wherein, in Formula (1) or (2) of diepoxy compound (b11) used as a starting material of phenolic hydroxy group-containing resin (B) and modified epoxy resin (A11), $R^1$ represents a methyl group or a hydrogen atom.

5. A coated article obtainable by immersing a metal article containing a hot dip galvanized steel sheet in a bath containing the cationic electrodeposition coating composition according to claim 1, and performing electrodeposition coating.

* * * * *

UNITED STATES PATENT AND TRADEMARK OFFICE
CERTIFICATE OF CORRECTION

PATENT NO. : 8,026,320 B2
APPLICATION NO. : 12/801164
DATED : September 27, 2011
INVENTOR(S) : Shigeo Nishiguchi et al.

It is certified that error appears in the above-identified patent and that said Letters Patent is hereby corrected as shown below:

On the Title Page

In Section (73), Assignee, "Kansai Print Co., Ltd., Hyogo (JP)" should read --Kansai Paint Co., Ltd., Hyogo (JP)--.

Signed and Sealed this
Tenth Day of January, 2012

David J. Kappos
*Director of the United States Patent and Trademark Office*